INVENTOR.
PETER CERVELLI
BY Edward Halle
ATTORNEY

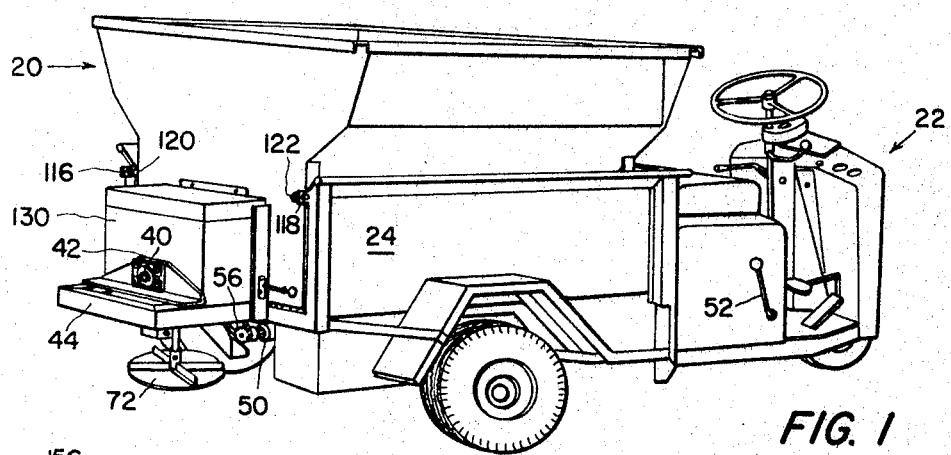
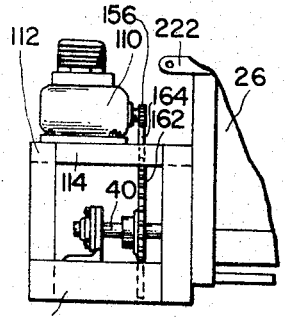
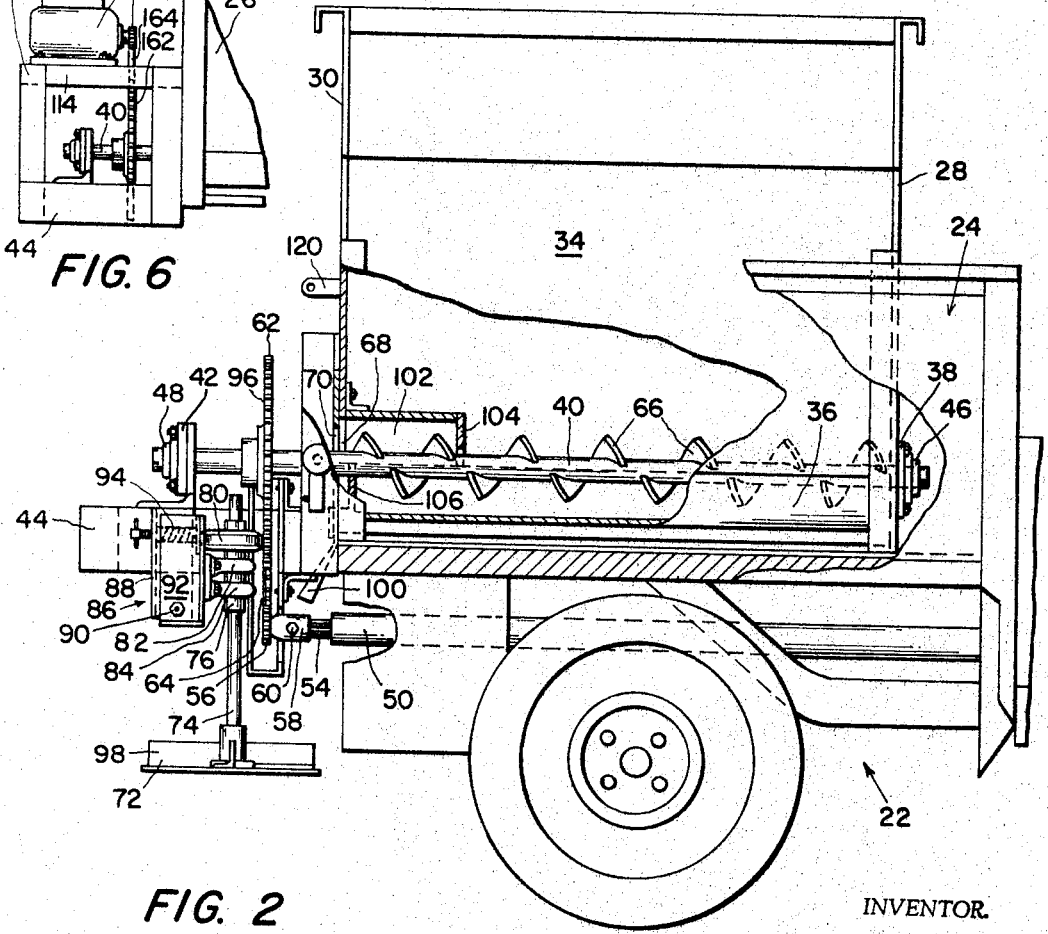
FIG. 1
FIG. 6
FIG. 2
INVENTOR.
PETER CERVELLI
BY Edward Halle
ATTORNEY May 30, 1967     P. CERVELLI     3,322,429
HOPPER ATTACHMENT FOR TRUCK BODY Filed June 23, 1965     2 Sheets-Sheet 2

United States Patent Office 3,322,429
Patented May 30, 1967

3,322,429
HOPPER ATTACHMENT FOR TRUCK BODY
Peter Cervelli, 602 Plainview Road,
Plainview, N.Y. 11803
Filed June 23, 1965, Ser. No. 466,151
6 Claims. (Cl. 275—8)

This invention relates to a hopper attachment for a standard truck body, and in particular relates to such a hopper attachment with material dispersal means, which may be removably attached to a power scooter having a pickup body, and power take-off means to operate the material dispersal means.

Motor scooters having pickup truck bodies and power take-offs, adapted to do a variety of jobs, are well known. It is an object of this invention to provide such a motor scooter with a removable hopper attachment adapted to contain small solid particles of material, said hopper having powered material dispersing means driven off a power take-off on the said motor scooter.

It is further object of this invention to provide such a hopper with material dispersal means which may be self powered.

It is another object of this invention to provide for such a hopper attachment to be removably secured to a truck body by means of a minimum number of fastening points.

It is also an object of this invention to provide a hopper attachment having improved auger means, and it is also an object of this invention to provide a hopper attachment having variable speed material dispersal means.

Another object of this invention is to provide a hopper attachment with an improved material discharge outlet or exit port, having baffle means to prevent accidental discharge of the material, and also to supply the exit port, or discharge outlet, with gate means to control the rate of discharge of the said material.

Further objects and advantages will appear in the specification hereinbelow. The objects are achieved with the invention as illustrated in the accompanying drawings in which:

FIG. 1 is a perspective view of a motor scooter having a power take-off with the invention attached;

FIG. 2 is a side elevation of the rear portion of the scooter as shown in FIG. 1 with parts cut away and parts in section;

FIG. 4 is a rear end elevation of the hopper body shown in FIG. 3 with the mechanism of the dispersal means removed to show the construction of the discharge outlet gates and associated parts, and with a portion of the rear wall removed and with parts dotted in;

FIG. 6 is a side elevational detail showing an alternate form of the invention.

Similar numerals refer to similar parts throughout the several views.

Figure 3:
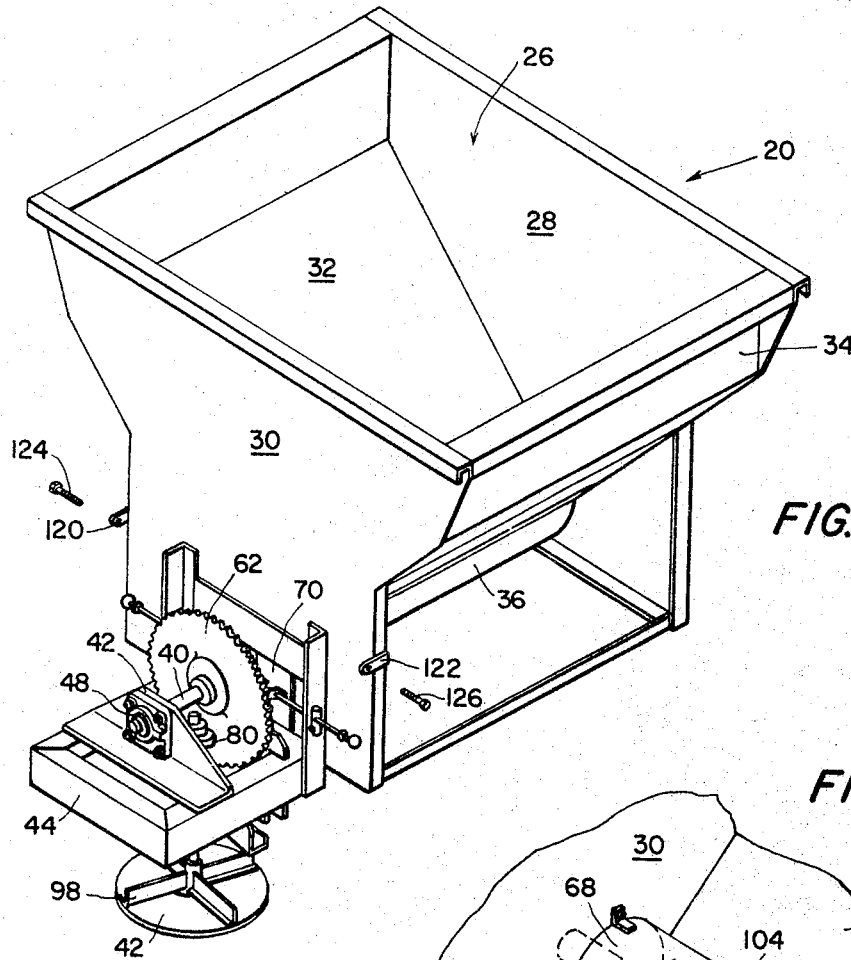
FIG. 3 is a perspective view of the hopper body of the invention removed from the motor scooter.
Figure 5:
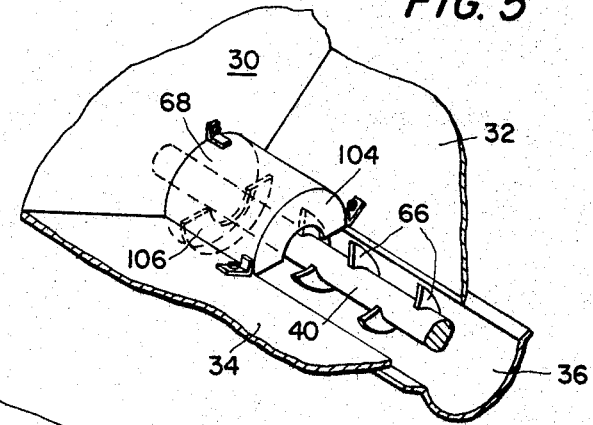
FIG. 5 is a perspective detail showing the lower rear interior of the hopper with parts dotted in to show the construction of the discharge outlet.
Figure 4:
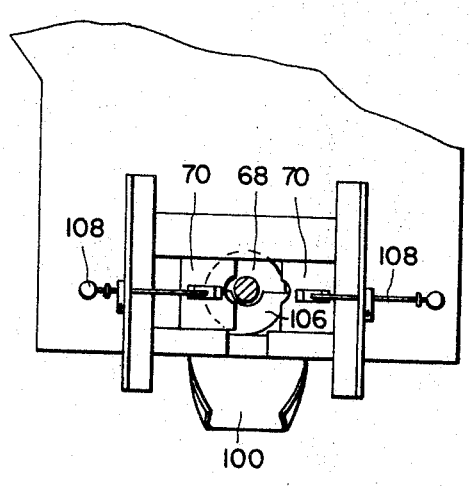

The hopper attachment 20 is mounted on a motor scooter 22 having a pickup body 24. The hopper attachment comprises hopper body 26 which, in effect, is the main frame of the hopper attachment 20. The body 26 comprises a front wall 28, a rear wall 30, side walls 32 and 34 which are tapered downwardly and inwardly to a trough 36. The various portions of the body are preferably made of a hard, durable metal such as steel which may be fastened together in any manner known to the art, preferably by spot welding. The front wall 28 has a bearing 38 for an auger shaft 40. Rear end of auger shaft 40 is provided with a bearing 42 which is supported by a rearwardly extending bracket 44. Suitable collars 46 and 48 are provided to maintain auger shaft 40 in its proper position in the device.

Power to drive the auger is taken off the power take-off shaft 50 of the motor scooter 22. The power take-off shaft 50 is a part of the usual power take-off supplied with a motor scooter such as motor scooter 22, and the power take-off is controlled by a lever such as lever 52. Shaft 50 should be placed so that the axis of rotation of the shaft 50 is substantially parallel to the longitudinal center line of the motor scooter 22. End of shaft 50 has male spline 54 on it and it is preferable that the male spline 54 should be located near the rear end of the pickup truck body 24.

A sprocket wheel 56 having an attached or integral female spline sleeve 58 with a bolt or fastening means 60 is provided to match the male spline 54. Female spline 58 will slip on male spline 54 and may be fastened by bolt 60. Sprocket wheel 56 is a drive sprocket wheel and drives sprocket wheel 62 by means of a chain transmission 64. Sprocket wheel 62 is a driven sprocket wheel and is affixed to auger shaft 40. Thus, when power take-off lever 52 is thrown into engagement, splines 54 and 56 will rotate causing sprocket wheel 56 to rotate to drive chain transmission 64 which in turn drives driven sprocket wheel 62 causing auger shaft 40 to rotate.

Auger shaft 40 is provided with a series of blades 66 which act in worm or screw-like fashion to move material which may be in the hopper 26 toward the discharge outlet 68. The blades 66 are arranged so as to form a non-continuous helix turn around the auger shaft 40. In other words, the blades 66 are designed to be a part of a continuous helix around the auger shaft 40 interrupted at regular intervals to form independent blades 66. This construction is admirably suited to a material conveyor in the bottom of a hopper since when the vehicle or the mechanism is moving at low speeds and it is not desired to feed the material, the auger may continue to rotate at a low speed without actually pushing the material toward the discharge outlet 68. When, however, the auger shaft 40 is speeded up as the vehicle moves faster or the power means is caused to rotate faster, rotation will cause each blade 66, now moving faster, to throw a quantity of material toward the next rearward blade and thus provide a proper rate of feed.

This construction mainly prevents build-up of material at the rear of the hopper at times when it is desirable to close the outlet gates 70. Thus, when outlet gates 70 are closed preventing discharge through the discharge outlet 68, even though there is some rotation of the auger shaft 40, there will be no build-up of material at the rear of the hopper causing undue pressure.

The invention includes a material dispersing means such as a disc disperser 72. The disc 72 is mounted on a shaft 74 which is mounted within a bearing assembly 76. The bearing assembly 76 maintains the shaft in a rotatable position, but does not permit it to slide longitudinally, thereby maintaining the disc 72 at a desired uniform height. Also mounted on shaft 74 is a drive wheel 80 which may be rubber tired. Drive wheel 80 has keying means (not shown) which are keyed to keying means on shaft 74 so that drive wheel 80 may be moved along shaft 74 for adjustment purposes as will be described hereinbelow, and yet will be fixed in rotation with shaft 74. The positioning of shaft drive wheel 80 is determined and adjusted by collars 82 and 84.

Bearing assembly 76 is attached to a swivel mounting such as a clapper box 86 which is mounted on bracket 44. Clapper box 86 comprises support arms 88, pivot shaft 90, bearing assembly mounting arm 92 and a spring 94 which is seated against the frame and against the spring mounting arm 92. Thus, wheel 80 at end of shaft 74 is spring coerced against side 96 of sprocket 62. When sprocket 62 rotates, wheel 80, the circumference of which is tangent to side 96 of sprocket wheel 62, will also rotate. The closer wheel 80 is to the axis of rotation of sprocket 62, the slower its speed will be, and the further wheel 80 is from the axis of rotation of sprocket 62, the greater its speed of rotation will be. Thus, by adjusting the positioning of wheel 80 along shaft 74 at varying distances from the axis of sprocket wheel 62, the speed of rotation of disc 72 can be controlled. Disc 72 may also be supplied with fins or vanes 98 to aid in the dispersal of material which may be moved out of discharge outlet 68, down chute 100, and thus caused to fall on top of disc 72. Rotation of disc 72 will then effectively disperse such material, spreading it in all directions.

Another feature of the invention is the tunnel 102 associated with discharge outlet 68. Tunnel 102 is, in effect, a continuation of trough 36 around the top of auger shaft 40 to provide a complete housing around the shaft 40 within the area of tunnel 102. At the forward end of tunnel 102 there is a baffle 104 which is semi-circular and extending over shaft 40. Toward the rear of tunnel 102 there is another baffle 106 which is semi-circular and is below shaft 40. Thus, in effect, the baffles 104 and 106 are in facing offset opposed positions. When material is pushed toward discharge outlet 68 by auger shaft 40 and blades 66, baffle 104 will prevent the material from entering tunnel 102 unless it is below baffle 104. Baffle 106 will prevent the material from leaving tunnel 102 unless it is above the level of baffle 106.

This construction effectively prevents unwanted dispersal of material by the device at such times when the power take-off is disconnected or when the device is moving and maneuvering at extremely low speeds. The rate of material flow is controlled by the speed of the power for the scooter combined with the hopper; also by the opening and closing of outlet gates 70 by means of handles 108. The range of dispersal area is controlled by the speed of disc 72 which may be adjusted by moving drive wheel 80 as explained hereinabove.

In FIG. 6 of the drawings, I show an alternate form of device. FIG. 6 shows only the driving mechanism for the auger 40 and for the dispersal disc 72, the rest of the device not being shown because it is substantially identical to the form as shown in FIGS. 1 and 2 of the drawings except that it might be much larger in size, being adapted to fit a truck much larger than a motor scooter. For such a larger hopper, the power take-off from a truck itself might be inconvenient to use or might be insufficient for the operation of the hopper. It is, therefore, desirable to provide the hopper with self-powering means such as is shown in the alternate form shown in FIG. 6 of the drawings.

It is to be understood that sprocket 62 as shown in FIG. 6 serves the same purpose as sprocket 62 as shown in FIG. 2, and that the dispersal disc 72 and its drive, including drive wheel 80, although not shown completely in FIG. 6, are driven by the sprocket wheel 62 of FIG. 6 in the same manner as they are driven by the sprocket wheel 62 in FIG. 2.

Thus, in the alternate form of device, motor 110 drives sprocket 156 which drives chain transmission 164 to drive sprocket 162. In this manner, auger shaft 40 is driven by the described self-powered means instead of being driven off a power take-off such as shaft 50.

The motor 110 may be any low horsepower motor having a built-in reduction gear such as a 6 to 1 reduction gear. Such gasoline motors are well known on the market and need not be further described. The motor 110 is supported over auger shaft 40 by means of extension frame members 112 and 114.

The form of device for use with motor scooters having power take-offs as shown in FIGS. 1 and 2 of the drawings is attached at three points. The tail gate of the truck body 24 (not shown) is removed. Brackets 116 and 118 are then matched by brackets 120 and 122 respectively on the hopper attachment. The hopper attachment is placed in the body 24 and bolts 124 and 126 are used to fasten the brackets together and hold the body in place. As the hopper body 20 is being installed, spline sleeve 58 is fitted to male spline 54 with transmission chain 64 in place over the sprockets 62 and 56. Then bolts 122, 124 and 60 are fastened completing the installation. The device may be removed by reversing the procedure thus making the attachment easily installable and removable.

In the form of device as illustrated in FIG. 6 of the drawings, the attachment to the power drive is, of course, omitted and there will preferably be a two-point attachment similar to that shown using brackets 116 and 188 of the truck matching similar brackets on the hopper body, said hopper body brackets being similar to brackets 120 and 122 of the first form of invention.

Either form of the invention may have a cover over the drive mechanism and the outlet port such as cover 130 shown in FIG. 1 of the drawings.

While I have described my invention in its preferred form, there are other forms which it may take without departing from the spirit and scope of the invention, and I, therefore, desire to be protected for all forms coming within the scope of the claims hereinbelow.

Wherefore I claim:

1. A hopper body for dispersing material adapted to be attached to a truck having main drive means, said hopper body comprising a dispersing disc in combination with feed means for feeding material from the hopper to the disc, said feed means comprising driven wheel means driven by drive means off the main drive means of the truck, and shaft means driven by said driven wheel means, said dispersing disc being mounted on second shaft means positioned substantially at right angles to said first mentioned shaft means, said second mentioned shaft means being mounted on spring actuated clapper box means mounted on said hopper body, said second mentioned shaft means including wheel means, mounted thereon, being spring pressed against a side of said first mentioned wheel means by the action of said clapper means.

2. The hopper body as defined in claim 1 adapted to be removably fitted to a standard power scooter truck body, said power scooter having main drive means including power take-off means, said drive means for said driven wheel means having removable connecting means adapted to be connected to said power take-off of said power scooter, and said hopper body having at least one fastening bracket adapted to be matched to at least one fastening bracket on said power scooter truck body, said fastening brackets having removable fastening means.

3. The device as defined in claim 1 in which the said second mentioned wheel means on said second mentioned shaft may be positioned at various points on said second mentioned shaft with relation to said side of said first mentioned wheel in order to vary the speed of said dispersing disc with relation to said first mentioned driven wheel means.

4. The hopper body as defined in claim 3 adapted to be removably fitted to a standard power scooter truck body, said power scooter having main drive means including power take-off means, said drive means for said driven wheel means having removable connecting means adapted to be connected to said power take-off of said power scooter, and said hopper body having at least one fastening bracket adapted to be matched to at least one fastening bracket on said power scooter truck body, said fastening brackets having removable fastening means.

5. A hopper body for dispersing material adapted to be removably fitted to a standard power scooter truck body, said power scooter having main drive means, said hopper body comprising a dispersing disc in combination with feed means for feeding material from the hopper to the disc, said feed means comprising driven wheel means driven by power means mounted on said removable hopper body separate from said main drive means of said scooter, and shaft means on said hopper body driven by said driven wheel means, said dispersing disc being mounted on second shaft means positioned substantially at right angles to said first mentioned shaft means, said second mentioned shaft means being mounted on spring actuated clapper box means mounted on said hopper body, said second mentioned shaft means including wheel means, mounted thereon, being spring pressed against a side of said first mentioned wheel means by the action of said clapper means, said hopper body having at least one fastening bracket adapted to be matched to at least one fastening bracket on said power scooter truck body, said fastening brackets having removable fastening means.

6. The device as defined in claim 5 in which the said second mentioned wheel means on said second mentioned shaft may be positioned at various points of said second mentioned shaft with relation to said side of said first mentioned wheel in order to vary the speed of said dispersing disc with relation to said first mentioned driven wheel means.

References Cited

UNITED STATES PATENTS

| Re. 23,887 | 10/1954 | Balluteen | 222—413 X |
| 1,013,786 | 1/1912 | Lambert | 64—12 |
| 2,393,849 | 1/1946 | Werts | 275—8 X |
| 3,159,315 | 12/1964 | Friesen | 222—178 X |
| 3,161,328 | 12/1964 | Haley | 222—561 X |

FOREIGN PATENTS 127,911    4/1950    Sweden.

ROBERT B. REEVES, *Primary Examiner.*

N. L. STACK, *Assistant Examiner.*